(12) United States Patent
Katz et al.

(10) Patent No.: US 9,931,594 B2
(45) Date of Patent: Apr. 3, 2018

(54) REMOVING ACID GASES FROM WATER VAPOUR-CONTAINING FLUID STREAMS

(71) Applicant: BASF SE, Ludwigshafen (DE)

(72) Inventors: Torsten Katz, Neustadt (DE); Christian Riemann, Altrip (DE); Georg Sieder, Bad Dürkheim (DE)

(73) Assignee: BASF SE, Ludwigshafen Am Rhein (DE)

( * ) Notice: Subject to any disclaimer, the term of this patent is extended or adjusted under 35 U.S.C. 154(b) by 458 days.

(21) Appl. No.: 13/780,377

(22) Filed: Feb. 28, 2013

(65) Prior Publication Data

US 2013/0230440 A1 Sep. 5, 2013

Related U.S. Application Data

(60) Provisional application No. 61/605,810, filed on Mar. 2, 2012.

(30) Foreign Application Priority Data

Mar. 2, 2012 (EP) ..................... 12157935

(51) Int. Cl.
*B01D 53/14* (2006.01)
*B01D 53/26* (2006.01)

(52) U.S. Cl.
CPC ..... *B01D 53/1456* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS

| 3,738,086 A | 6/1973 | Bellisio et al. |
| 4,286,971 A | 9/1981 | Burcaw, Jr. et al. |

(Continued)

FOREIGN PATENT DOCUMENTS

| EP | 0 696 469 A1 | 2/1996 |
| EP | 2228119 A1 | 9/2010 |

(Continued)

OTHER PUBLICATIONS

Yudy Halim Tan, "Study of CO2-Absorption into Thermomorphic Lipophilic Amine Solvents", Thesis, University of Dortmund, Germany, Sep. 24, 2010.*

(Continued)

*Primary Examiner* — Anita Nassiri Motlagh
(74) *Attorney, Agent, or Firm* — Drinker Biddle & Reath LLP

(57) ABSTRACT

A process for removing acid gases from a water vapor-containing fluid stream comprises a) providing an absorption liquid which is incompletely miscible with water; b) treating the fluid stream in an absorption zone with the absorption liquid to obtain an acid gas-depleted treated fluid stream and an acid gas-loaded absorption liquid; c) directing the treated fluid stream to a rehydration zone and treating the fluid stream with an aqueous liquid to volatilize at least part of the aqueous liquid; d) regenerating the loaded absorption liquid to expel the acid gases at least in part and obtain a regenerated absorption liquid, and directing the regenerated absorption liquid to step b); and e) separating, from the absorption liquid, an aqueous liquid that has condensed in the absorption zone, and directing the aqueous liquid to step c). The process allows for an efficient removal of water accumulated in the absorption liquid system.

14 Claims, 2 Drawing Sheets

(52) U.S. Cl.
CPC ........ *B01D 53/1493* (2013.01); *B01D 53/263* (2013.01); *B01D 53/265* (2013.01); *B01D 2252/202* (2013.01); *B01D 2252/2053* (2013.01); *B01D 2252/40* (2013.01); *B01D 2252/504* (2013.01); *B01D 2256/24* (2013.01); *B01D 2257/302* (2013.01); *B01D 2257/304* (2013.01); *B01D 2257/306* (2013.01); *B01D 2257/308* (2013.01); *B01D 2257/408* (2013.01); *B01D 2257/504* (2013.01); *B01D 2257/80* (2013.01); *B01D 2258/0283* (2013.01); *B01D 2258/05* (2013.01)

(56) References Cited

U.S. PATENT DOCUMENTS

| | | | |
|---|---|---|---|
| 7,799,299 B2* | 9/2010 | Heldebrant et al. | 423/220 |
| 8,455,693 B2 | 6/2013 | Chedid et al. | |
| 8,529,857 B2 | 9/2013 | Sieder et al. | |
| 2006/0104877 A1 | 5/2006 | Cadours et al. | |
| 2007/0286783 A1* | 12/2007 | Carrette et al. | 423/228 |
| 2009/0199709 A1* | 8/2009 | Rojey et al. | 95/46 |
| 2010/0319540 A1* | 12/2010 | Garcia Andarcia et al. | 95/180 |
| 2011/0229393 A1 | 9/2011 | Hu | |
| 2013/0211171 A1 | 8/2013 | Riemann et al. | |
| 2013/0259789 A1 | 10/2013 | Katz et al. | |

FOREIGN PATENT DOCUMENTS

| | | |
|---|---|---|
| FR | 2 942 973 A1 | 9/2010 |
| WO | WO-2009097317 A2 | 8/2009 |
| WO | WO-2012/031274 A1 | 3/2012 |

OTHER PUBLICATIONS

International Search Report for PCT/EO2013/053775 dated May 27, 2013.

* cited by examiner

REMOVING ACID GASES FROM WATER VAPOUR-CONTAINING FLUID STREAMS

CROSS-REFERENCE TO RELATED APPLICATIONS

This application claims the benefit of U.S. Provisional Application 61/605,810, filed Mar. 2, 2012, and European Application 12157935.3, filed Mar. 2, 2012, both of which are incorporated herein by reference.

BACKGROUND OF THE INVENTION

The present invention relates to a process for removing acid gases from a water vapour-containing fluid stream, in particular for removing carbon dioxide from combustion exhaust gases.

Combustion of fossil fuels generates the acid gases, carbon dioxide ($CO_2$), sulfur oxides ($SO_2$), carbonyl sulfide (COS), hydrogen sulfide ($H_2S$) and nitrogen oxides ($NO_x$). Emission of acid gases into the air is considered to be the main cause of global effects on the environment which are termed the greenhouse effect. The removal of acid gases from combustion exhaust gases is therefore desirable to reduce the environmental effects of these sources.

Current aqueous scrubbing technologies remove acid gases by treating the fluid streams with aqueous solutions of inorganic or organic bases, e.g. alkanolamines, as absorbents. On the dissolution of acid gases, ionic products form from the base and the acid gas components. The absorbent can be regenerated by heating, expansion to a lower pressure or stripping, in which case the ionic products react back to acid gases and/or the acid gases are stripped off by means of steam. After the regeneration process the absorption liquid can be reused.

Non-aqueous absorption liquids have been used to remove acid gases from fluid streams. It is claimed that non-aqueous absorption liquids require less energy for regeneration than aqueous solutions of organic bases. Single-component alcoholic physisorption solvents such as RECTISOL® and SELEXOL® are commercially available for $CO_2$ separation but perform poorly in the humid, near-ambient pressure conditions associated with combustion exhaust gas.

Ionic liquids are another non-aqueous absorption liquid currently being developed. These absorption liquids have higher $CO_2$ loadings than some aqueous amines, and are regenerable under milder conditions.

WO 2009/097317 discloses reversible acid-gas binding liquid systems that permit capture of acid gases and release of the acid gases from the liquid by the activation of a trigger. The exemplified systems are equimolar mixtures of amidine or guanidine nitrogen bases and alcohols. They are non-ionic room temperature liquids that react with $CO_2$ to form room-temperature ionic liquids. $CO_2$ is captured via the formation of amidinium and guanidinium alkyl carbonate salts derived from the conjugate bases of the deprotonated alcohol components.

Combustion exhaust gases typically contain appreciable amounts of water vapour or are water vapour-saturated. Upon contact of a non-aqueous absorption liquid with the water vapour-containing fluid stream, water vapour may condense and/or become dissolved into the non-aqueous absorption liquid. On the other hand, the non-aqueous absorption liquid may not show a significant water vapour partial pressure, so that the treated fluid stream will not take up an appreciable amount of water vapour when leaving the absorption unit.

These effects can lead to the accumulation of water in the absorption liquid either as a single-phase solution or bi-phase mixture, depending upon the process conditions (e.g., pressure, temperature, water concentration) and the affinity of the non-aqueous absorption liquid for water. Water accumulation is detrimental to the acid gas separation and purification process, since more energy will be required for absorption liquid regeneration due to the necessity of continually removing water from the absorption liquid.

Thus, the amount of water that accumulates in the absorption liquid system must be removed from the process in order to fulfil the overall water balance.

When the absorption liquid is incompletely miscible with water (or, in other words, shows a miscibility gap with water), the water introduced may sooner or later accumulate as a separate aqueous phase within the absorption liquid system. The aqueous phase may be separated by, e.g., a decanter, and discharged as a liquid bleed. Since, however, the absorption liquid shows—even though limited—solubility in water the liquid bleed contains traces of absorption liquid and will cause undesirable absorption liquid losses. To be properly discharged, the liquid bleed must be purified. Purification of the liquid bleed is costly and technically difficult and therefore not a preferred option. As a result, bleeding liquid water constitutes a clear economic and ecological disadvantage and decreases the commercial attractiveness of the process.

Accordingly, there is a need for a process for removing acid gases from a water vapour-containing fluid stream, which allows for an efficient removal of water accumulated in the absorption liquid system.

EP-A 2 228 119 discloses a method for removal of acid compounds from a gas by carrying out an absorption step with an absorption liquid. The treated gas is washed and cooled in a washing section by contacting with a liquid water flow having a predetermined temperature, so as to obtain a washed gas whose temperature is lower than temperature of the gas to be treated. A quantity of water contained in the acid compound-rich effluent is withdrawn to prevent accumulation of water in the absorption liquid.

The invention provides a process for removing acid gases from a water vapour-containing fluid stream comprising
  a) providing an absorption liquid which is incompletely miscible with water;
  b) treating the fluid stream in an absorption zone with the absorption liquid to obtain an acid gas-depleted treated fluid stream and an acid gas-loaded absorption liquid;
  c) directing the treated fluid stream to a rehydration zone and treating the fluid stream with an aqueous liquid to volatilize at least part of the aqueous liquid;
  d) regenerating the loaded absorption liquid to expel the acid gases at least in part and obtain a regenerated absorption liquid, and directing the regenerated absorption liquid to step b); and
  e) separating, from the absorption liquid, an aqueous liquid that has condensed in the absorption zone, and directing the aqueous liquid to step c).

A BRIEF DESCRIPTION OF THE FIGURES

A DETAILED DESCRIPTION OF THE INVENTION

Figure 1:
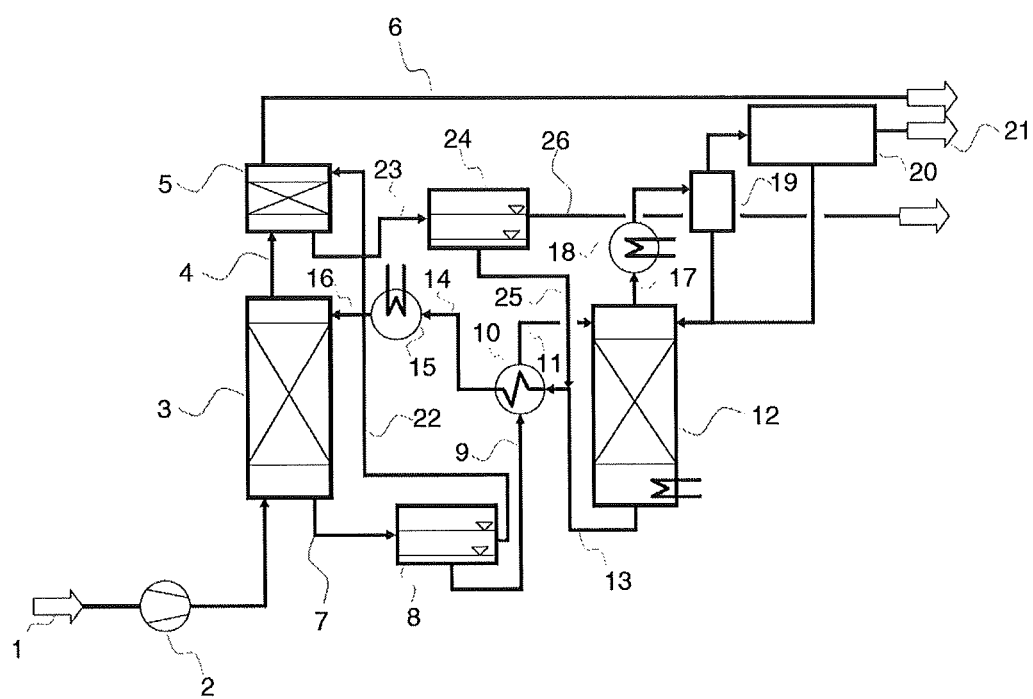
FIG. 1 shows an installation suitable for carrying out the method according to the invention.

The absorption liquid used in the process is incompletely miscible with water or, in other words, shows a miscibility gap with water. In preferred embodiments, the absorption liquid is essentially immiscible with water. Generally, less than 20% by weight of water is soluble in the absorption liquid at 25° C., for example less than 10% by weight or less than 8% by weight, preferably less than 5% by weight of water. If a higher amount of water is present, a separate aqueous phase will form within the absorption liquid.

The method according to the invention is suitable for the treatment of water vapour-containing fluid streams, in particular water vapour-containing gas streams of all types. The acid gases comprise, in particular, $CO_2$, $H_2S$, COS and mercaptans. In addition, $SO_3$, $SO_2$, $CS_2$ and HCN can also be removed. Generally, the acid gases comprise at least $CO_2$ or may comprise exclusively $CO_2$.

The process according to the invention is particularly applicable to the treatment of fluid streams wherein the partial pressure of acid gases in the fluid stream is less than 2 bar, preferably less than 1 bar, e.g. less than 500 mbar.

Fluids, which comprise the acid gases are either gases such as natural gas, synthesis gas, coke oven gas, cracked gas, coal gasification gas, recirculated cycle gas, landfill gases and combustion gases or liquids which are essentially immiscible with the absorbent such as liquefied petroleum gas (LPG) or natural gas liquids (NGL).

In preferred embodiments, the fluid stream originates
i) from the oxidation of organic substances,
ii) from the composting or storage of waste materials comprising organic substances, or
iii) from the bacterial decomposition of organic substances.

The oxidation can be carried out with appearance of flame, i.e. as conventional combustion, or as oxidation without appearance of flame, e.g. in the form of a catalytic oxidation or partial oxidation. Organic substances which are subjected to the combustion are customarily fossil fuels, such as coal, natural gas, petroleum, gasoline, diesel, raffinates or kerosene, biodiesel or waste materials having a content of organic substances. Feed stocks of the catalytic (partial) oxidation are e.g. methanol or methane which can be converted to formic acid or formaldehyde.

Waste materials which are subjected to oxidation, composting or storage are typically domestic refuse, plastic wastes or packaging refuse.

The organic substances are combusted mostly in customary combustion plants with air. The composting and storage of waste materials comprising organic substances generally proceed in refuse landfills. The exhaust gas or the exhaust air of such facilities can be treated advantageously by the method according to the invention.

As organic substances for bacterial decomposition use is customarily made of stable manure, straw, liquid manure, clarified sewage sludge, fermentation residues and the like. The bacterial decomposition proceeds e.g. in customary biogas plants. The exhaust air of such plants can advantageously be treated by the method according to the invention.

The method is also suitable for the treatment of exhaust gases of fuel cells or chemical synthesis plants which make use of a (partial) oxidation of organic substances.

The fluid streams of the origin i), ii) or iii) above can have, for example, either the pressure which roughly corresponds to the pressure of the ambient air, that is to say e.g. atmospheric pressure, or a pressure which deviates from atmospheric pressure by up to 1 bar. However, the fluid stream may also have a higher pressure.

Exhaust gases from combustion processes are preferred fluid streams to be treated according to the invention.

The fluid stream is brought into fluid-liquid contact with the absorption liquid in the absorption zone. The absorption zone may comprise any suitable apparatus, for example an absorption tower or an absorption column, e.g. a random packed column, arranged packing column, a tray column and/or in another absorber such as membrane contactors, radial flow scrubbers, jet scrubbers, Venturi scrubbers and rotary spray scrubbers. The fluid stream is preferably treated with the absorption liquid in an absorption column in countercurrent flow. The fluid stream in this case is generally fed into the lower region of the absorption zone and the absorption liquid into the upper region of the absorption zone. A treated fluid stream depleted of acid gases is formed and an absorption liquid loaded with acid gases is formed.

Water vapour contained in fluid stream condenses and/or becomes dissolved into the absorption liquid. Due to the limited solubility of water in the absorption liquid the water ultimately accumulates as a separate, aqueous phase within the absorption liquid. Preferably, separating the aqueous liquid comprises subjecting the loaded absorption liquid to liquid-liquid phase separation to separate the aqueous liquid therefrom. The aqueous phase may be separated by at least one of decanting, and centrifuging.

Mechanical coalescing techniques or electrocoalescing may be employed in order to obtain the aqueous liquid and the absorption liquid one another in cohesive form and largely free of extraneous phase.

For decanting, the bi-phase mixture can be introduced into a calming zone and be separated there. This is advantageously achieved in a horizontal, continuously operated phase separation vessel through which the mixture flows at a low flow velocity. Due to the density difference between the phases, the mixture separates in the gravitational field. Separators having coalescence internals such as packing elements, coalescence surfaces or porous elements may suitably be used.

The relative densities of the aqueous liquid and the absorption liquid will determine which layer is upper and which is lower. The aqueous liquid will separate as upper layer when the density of the absorption liquid is greater than that of the aqueous liquid. The aqueous liquid will separate as lower layer when the density of the absorption liquid is smaller than that of the aqueous liquid.

The aqueous liquid separated from the absorption liquid is directed to a rehydration zone. In the rehydration zone, the treated fluid stream which is depleted of acid gases, is brought into fluid-liquid contact with the aqueous liquid. The rehydration zone may comprise any suitable apparatus for contacting a fluid and a liquid, for example a random packed column, arranged packing column, or a tray column. At least part of the aqueous liquid is volatilized and picked up by the treated fluid stream. Thus, the treated fluid stream acts as an outlet for at least part of the accumulated water. No significant additional energy expenditure is involved.

Suitably, the rehydration zone is arranged on top of the absorption zone. Thus, in a suitable embodiment the fluid stream is passed upwards through a tower including a lower portion containing the absorption zone for performing step b) and an upper portion containing the rehydration zone for performing step c).

Figure 2A:
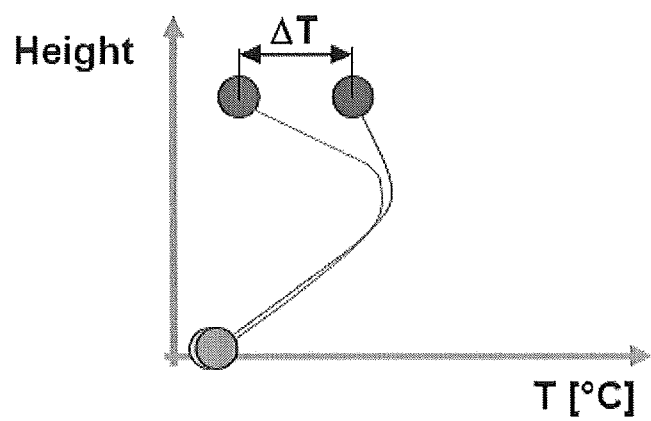
FIG. 2a shows the temperature profile in the absorption zone in a situation where the heat capacity of the fluid stream is significantly greater than the heat capacity of the absorption liquid.
Figure 2B:
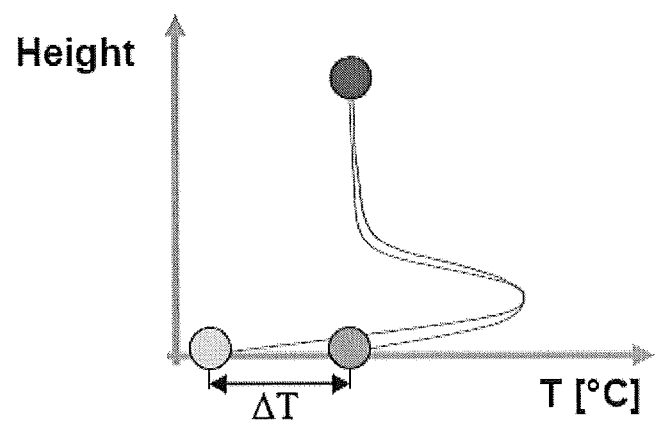
FIG. 2b shows the temperature profile in the absorption zone in a situation where the heat capacity of the absorption liquid is significantly greater than the heat capacity of the fluid stream.

Generally, absorption of acid gases from the fluid stream into the absorption liquid is an exothermic process. Whether the exothermic heat is taken up by the absorption liquid or the treated fluid stream largely depends on the relative heat capacities of the absorption liquid and the fluid stream. Heat capacity is the product of mass flow $\dot{M}$ and specific heat capacity $c_p$. FIG. 2a exemplifies the temperature profile in the absorption zone in a situation where the heat capacity of the fluid stream is significantly greater than the heat capacity of the absorption liquid. The temperature of the treated fluid stream at the top of the absorption zone is higher than the temperature of the absorption liquid introduced at the top of the absorption zone and also higher than the temperature of the fluid stream introduced at the bottom of the absorption zone. FIG. 2b exemplifies the temperature profile in the absorption zone in a situation where the heat capacity of the absorption liquid is significantly greater than the heat capacity of the fluid stream.

The temperature profile of FIG. 2a is characteristic of an acid gas removal application where $(\dot{M} c_p)_{fluid}/(\dot{M} c_p)_{absorption\ liquid} > 0.5$. This is typically the case for the treatment of fluids having low acid gas partial pressures, such as, e.g., combustion exhaust gases or low carbon dioxide natural gas. Low acid gas partial pressures result in absorption liquid circulation rates being low. The higher temperature of the treated fluid stream at the top of the absorption zone facilitates volatilization of the aqueous liquid in the rehydration zone and uptake of water vapour by the treated fluid stream.

In preferred embodiments, the rehydration zone also acts as a scrubbing or backwash zone in order to transfer absorption liquid which is entrained by the treated fluid stream at least in part into the aqueous liquid. Emissions of the absorption liquid via the treated fluid stream are avoided by scrubbing the treated fluid stream with the aqueous liquid. To exert a scrubbing action, the aqueous liquid must not be completely volatilized in step c). Spent aqueous liquid loaded with entrained absorption liquid may be collected at the bottom of the rehydration zone. The spent aqueous liquid may be circulated from the bottom of the rehydration zone to the top thereof via a pump, in order to increase the hydraulic load of the rehydration zone for sufficient wetting and scrubbing. Additional feed water may be fed into the rehydration zone in order to improve the scrubbing efficiency.

At least part of the spent aqueous liquid may be recycled into the process, i.e., combined with the bulk loaded absorption liquid or the bulk regenerated absorption liquid or both.

In a preferred embodiment, the spent aqueous liquid is subjected to liquid-liquid phase separation to obtain an aqueous phase and an entrained absorption liquid phase. At least part of the entrained absorption liquid phase may be recycled into the process, i.e., combined with the bulk loaded absorption liquid or the bulk regenerated absorption liquid or both. The aqueous phase may be discharged, e.g., sent to waste water treatment. The volume of this aqueous phase is considerably smaller than the volume of the aqueous liquid originally separated from the absorption liquid: Consequently, absorption liquid losses via the discharged aqueous phase would be decreased.

From the absorption liquid which is loaded with the acid gas components, carbon dioxide and other acid gases can be liberated in a regeneration step, wherein a regenerated absorption liquid is obtained. The resultant regenerated absorption liquid is subsequently recycled to the absorption zone. Expediently, regeneration of the loaded absorption liquid occurs by pressure release, heating, stripping or any combination thereof.

Generally, the loaded absorption liquid is regenerated by heating, expansion, stripping with an inert fluid or a combination of two or all of these measures. Preferably, the loaded absorption liquid is regenerated in a stripper. The stripping gas required for the stripping is generated by partial evaporation of the absorption liquid in the bottom of the stripper.

In order to withdraw permanently from the earth's atmosphere the carbon dioxide which is eliminated, the carbon dioxide is customarily compressed and then forced into subterranean deposits. In an embodiment of the process, the liberated acid gases are preferably fed into at least one compression unit. The compressed gases can then be fed to a permanent storage (Carbon Capture and Storage, CCS) or used in enhanced oil recovery or enhanced gas recovery. Alternatively, the carbon dioxide may be subjected to an industrial utilization such as urea synthesis or methanol synthesis (Carbon Capture and Utilization, CCU).

Before the regenerated absorption liquid is reintroduced into the absorption zone, it is cooled to a suitable absorption temperature. When the regeneration of the loaded absorption liquid involves heating of the loaded absorption liquid, it is preferred, in order to utilize the energy present in the hot regenerated absorption liquid, to preheat the loaded absorption liquid from the absorber by heat exchange with the hot regenerated absorption liquid. By means of the heat exchange the loaded absorption liquid is brought to a higher temperature, and so in the regeneration step a lower energy input is required. By means of the heat exchange, also a partial regeneration of the loaded absorption liquid can proceed with liberation of acid gases.

The absorption liquid used in the process is incompletely miscible with water. Switchable ionic liquids are preferred absorption liquids. In suitable embodiments, the absorption liquid comprises a nitrogenous base and a weak acid. The nitrogenous base may be selected from amidines, guanidines and combinations thereof. The weak acid may be selected from alcohols. Preferably, the nitrogenous base and the weak acid are selected according to their limited miscibility with water. A suitable absorption liquid is a mixture of diazabicyclo[5.4.0]undec-7-ene (DBU) and 1-hexanol.

The invention will be illustrated in more detail by the accompanying drawings.

FIG. 1 shows an installation suitable for carrying out the method according to the invention.

FIG. 2a shows the temperature profile in the absorption zone in a situation where the heat capacity of the fluid stream is significantly greater than the heat capacity of the absorption liquid. FIG. 2b shows the temperature profile in the absorption zone in a situation where the heat capacity of the absorption liquid is significantly greater than the heat capacity of the fluid stream.

According to FIG. 1, a fluid stream 1, e.g., a flue gas stream, is passed via blower 2 into the lower part of the absorption column 3 and brought into contact in countercurrent flow with an absorption liquid which is introduced via the line 16 into the upper region of the absorption column 3. The treated fluid stream depleted in carbon dioxide is fed via line 4 into a rehydration zone 5. An aqueous liquid is introduced in the rehydration zone 5 via the line 22. In the rehydration zone 5, entrained absorption liquid is eliminated from the treated fluid stream; also part of the aqueous liquid is volatilized and the treated fluid stream is saturated with water vapour. The treated fluid stream is removed from the rehydration zone 5 via the line 6.

The absorption liquid which is loaded with carbon dioxide is fed from the bottom of the absorption column 3 via line 7 to the decanter 8. An aqueous liquid accumulates as upper layer in decanter 8 and is withdrawn via line 22. Absorption liquid freed from the aqueous liquid separates as lower layer in decanter 8 and is fed via line 9, heat exchanger 10 and line 11 to the stripper 12. In the bottom part of the stripper 12 the loaded absorption liquid is heated via a reboiler. As a result of the temperature elevation, the absorbed acid gases are converted back into the gas phase. The gas phase is removed at the top of the stripper 12 and fed via line 17 to the condenser 18. Absorption liquid which is condensed out is collected in the phase separator 19 and refluxed to the stripper 12. The gaseous acid gases may be conducted to the compressor unit 20 and sent to sequestration via line 21. The regenerated absorption liquid 13 is recycled back to the absorption column 3 via the heat exchanger 10, line 14, the cooler 15, and line 16.

The spent aqueous liquid collected at the bottom of the rehydration zone 5 is sent via line 23 to the decanter 24. An aqueous phase accumulates as upper layer in decanter 24 and is discharged via line 26. Entrained absorption liquid separates as lower layer in decanter 24 and is combined via line 25 with the bulk of the regenerated absorption liquid withdrawn from the bottom of the stripper 12 via line 13.

We claim:

1. A process for removing acid gases from a water vapour-containing fluid stream comprising
    a) providing an absorption liquid which is incompletely miscible with water;
    b) treating the water vapour-containing fluid stream in an absorption zone with the absorption liquid to obtain an acid gas-depleted treated fluid stream and an acid gas-loaded absorption liquid;
    c) directing the acid gas-depleted treated fluid stream to a rehydration zone and treating the acid gas-depleted treated fluid stream with an aqueous liquid to volatilize at least part of the aqueous liquid;
    d) regenerating the acid gas-loaded absorption liquid to expel the acid gases at least in part and obtain a regenerated absorption liquid, and directing the regenerated absorption liquid to step b); and
    e) separating, from the acid gas-loaded absorption liquid, an aqueous liquid that has condensed in the absorption zone, and directing the aqueous liquid to step c),
    wherein separating the aqueous liquid comprises subjecting the acid gas-loaded absorption liquid to liquid-liquid phase separation to separate the aqueous liquid therefrom;
    wherein regenerating the acid gas-loaded absorption liquid occurs by pressure release, heating, stripping or any combination thereof.

2. The process according to claim 1, wherein the absorption liquid is essentially immiscible with water.

3. The process according to claim 1, wherein the aqueous liquid is incompletely volatilized in step c) so as to scrub the acid gas-depleted treated fluid stream with the aqueous liquid to remove entrained absorption liquid from the acid gas-depleted treated fluid stream, and to collect a spent aqueous liquid loaded with entrained absorption liquid.

4. The process according to claim 3, wherein at least part of the spent aqueous liquid is combined with the absorption liquid in step a) or the regenerated absorption liquid of step d) or both.

5. The process according to claim 3, wherein the spent aqueous liquid is subjected to liquid-liquid phase separation to obtain an aqueous phase and an entrained absorption liquid phase, and at least part of the entrained absorption liquid phase is combined with the absorption liquid in step a) or the regenerated absorption liquid of step d) or both.

6. The process according to claim 1, wherein the fluid stream has an acid gases partial pressure of less than 2 bar.

7. The process according to claim 1, wherein the fluid stream is an exhaust gas from a combustion process.

8. The process according to claim 1, wherein the acid gas-loaded absorption liquid is preheated by indirect heat exchange with the regenerated absorption liquid.

9. The process according to claim 1, wherein the absorption liquid comprises a nitrogenous base and a weak acid.

10. The process according to claim 9, wherein the nitrogenous base is selected from amidines, guanidines and combinations thereof.

11. The process according to claim 9, wherein the weak acid is selected from alcohols.

12. The process according to claim 1, wherein less than 20% by weight of water is soluble in the absorption liquid at 25° C.

13. The process according to claim 1, wherein less than 5% by weight of water is soluble in the absorption liquid at 25° C.

14. The process according to claim 1, wherein the rehydration zone is arranged on top of the absorption zone.

* * * * *